(12) United States Patent
Takehara et al.

(10) Patent No.: US 7,840,182 B2
(45) Date of Patent: Nov. 23, 2010

(54) INFORMATION PROCESSING APPARATUS AND INFORMATION PROCESSING METHOD

(75) Inventors: Mitsuru Takehara, Tokyo (JP); Yoichiro Sako, Tokyo (JP); Toshiro Terauchi, Tokyo (JP); Makoto Inoue, Tokyo (JP); Toru Sasaki, Tokyo (JP); Yuichi Sakai, Kanagawa (JP); Masafumi Matsuda, Tokyo (JP); Motoyuki Takai, Tokyo (JP); Katsuya Shirai, Kanagawa (JP); Masamichi Asukai, Kanagawa (JP); Takatoshi Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1033 days.

(21) Appl. No.: 11/599,545

(22) Filed: Nov. 14, 2006

(65) Prior Publication Data

US 2007/0123168 A1 May 31, 2007

(30) Foreign Application Priority Data

Nov. 16, 2005 (JP) .............................. 2005-330953

(51) Int. Cl.
*H04B 1/00* (2006.01)
(52) U.S. Cl. ..................................... 455/41.2; 455/557
(58) Field of Classification Search ................ 455/41.2, 455/557, 41.1
See application file for complete search history.

(56) References Cited

U.S. PATENT DOCUMENTS

| 2002/0168938 A1* | 11/2002 | Chang .......................... 455/41 |
| 2002/0193142 A1* | 12/2002 | Stavenow et al. ........... 455/556 |
| 2003/0162575 A1* | 8/2003 | Morota et al. ............... 455/575 |
| 2004/0259499 A1* | 12/2004 | Oba et al. ................... 455/41.2 |
| 2006/0068703 A1* | 3/2006 | Ng et al. ..................... 455/41.2 |
| 2006/0194589 A1* | 8/2006 | Sankisa .................... 455/456.1 |
| 2009/0104874 A1* | 4/2009 | Ellis .......................... 455/41.2 |

FOREIGN PATENT DOCUMENTS

| JP | 2002-027552 A | 1/2002 |
| JP | 2002-058069 A | 2/2002 |
| JP | 2002-094687 A | 3/2002 |
| JP | 2002-223466 A | 8/2002 |
| JP | 2002-224449 A | 8/2002 |
| JP | 2002-271253 A | 9/2002 |
| JP | 2003-051771 A | 2/2003 |
| JP | 2005-006766 A | 1/2005 |
| JP | 2005-095697 A | 4/2005 |
| JP | 2005-125116 A | 5/2005 |
| JP | 2005-148956 A | 6/2005 |
| JP | 2005-152665 A | 6/2005 |
| JP | 2005-176396 A | 6/2005 |

* cited by examiner

*Primary Examiner*—Creighton Smith
(74) *Attorney, Agent, or Firm*—Wolf, Greenfield & Sacks, P.C.

(57) ABSTRACT

Disclosed herein is an information processing apparatus including, a wireless communication block configured to execute wireless communication with a mate terminal device, an information exchange generation condition storage block configured to record a condition of information exchange with the mate terminal device, an information exchange log storage block configured to record a log of information exchange with the mate terminal device, and an information exchange generation determination block configured to determine whether to execute information exchange with the mate terminal device by referencing the information exchange condition recorded in the information exchange generation condition storage block and the log of information exchange recorded in the information exchange log storage block.

11 Claims, 7 Drawing Sheets

FIG.1
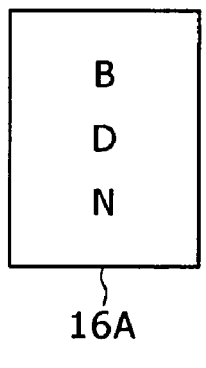
TERMINAL A
16A
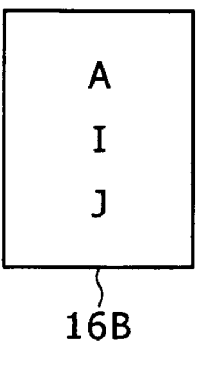
B
16B
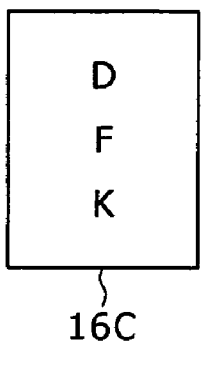
C
16C
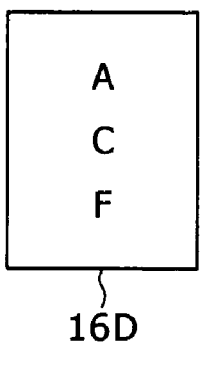
D
16D
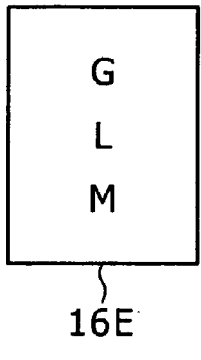
E
16E
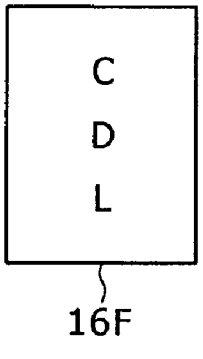
F
16F
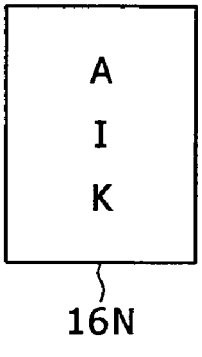
N
16N
FIG.2
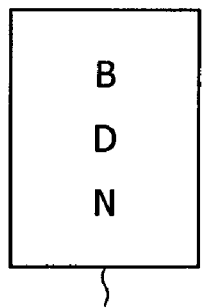
TERMINAL A
16A
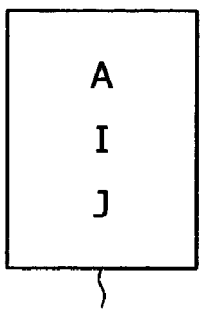
B
16B

FIG. 10

| CONTENT ID | TITLE | ARTIST | ALBUM | GENRE | YEAR OF RELEASE |
|---|---|---|---|---|---|
| XXX01 | ABCEE | The Algo | Fly | Pop | 2004 |
| XXX05 | AEGIW | The Fiifs | Ocean | Rock | 1999 |
| ...... | ...... | ...... | ...... | ...... | ...... |
| XX021 | Good | The Kisds | Flower | Pop | 2005 |

INFORMATION PROCESSING APPARATUS AND INFORMATION PROCESSING METHOD

CROSS REFERENCES TO RELATED APPLICATIONS

The present invention contains subject matter related to Japanese Patent Application JP 2005-330953 filed in the Japanese Patent Office on Nov. 16, 2005, the entire contents of which being incorporated herein by reference.

BACKGROUND OF THE INVENTION

1. Field of the Invention

The present invention relates to an information processing apparatus and an information processing method.

2. Description of the Related Art

Some portable game machines are adapted to virtually grow a character (or a hero), exchange the information about the growth with other game machines, and have the character fight the characters of other game machines, for example. In the exchange of information, some portable game machines can have the owner of each machine explicitly specify a mate (or a mate game machine) of the information exchange.

The related art includes the following:
[Patent document 1]
Japanese Patent Laid-open No. 2005-95697
[Patent document 2]
Japanese Patent Laid-open No. 2005-125116
[Patent document 3]
Japanese Patent Laid-open No. 2005-152665
[Patent document 4]
Japanese Patent Laid-open No. 2005-176396

SUMMARY OF THE INVENTION

However, with related-art game machines, if the owner of a particular game machine does not explicitly specify a mate of the information exchange, any one of other game machines that physically get close to that particular game machine is selected by chance as the mate of the information exchange. Consequently, in an environment where frequency physical contact is made with a same mate, the frequency in which information is exchanged with the same mate becomes extremely high, thereby possibly leading to the lowering of the advantage in information exchange and the loss of interest.

Therefore, the present invention addresses the above-identified and other problems associated with related-art methods and apparatuses and solves the addressed problems by providing an information processing apparatus and an information processing method.

In carrying out the invention and according to one aspect thereof, there is provided an information processing apparatus. This information processing apparatus has a wireless communication block configured to execute wireless communication with a mate terminal device; an information exchange generation condition storage block configured to record a condition of information exchange with the mate terminal device; an information exchange log storage block configured to record a log of information exchange with the mate terminal device; and an information exchange generation determination block for determining whether to execute information exchange with the mate terminal device by referencing the information exchange condition recorded in the information exchange generation condition storage block and the log of information exchange recorded in the information exchange log storage block.

As described above and according to the present invention, if a plurality of mate information processing apparatuses get close to an own information processing apparatus, the own information processing apparatus can execute information exchange preferentially with those mate information apparatuses with which the own information processing apparatus has not executed information exchange.

BRIEF DESCRIPTION OF THE DRAWINGS

Other objects and aspects of the invention will become apparent from the following description of embodiments with reference to the accompanying drawings in which:

FIG. 1 is a schematic diagram illustrating one example of contents of an information exchange log list for use in the embodiments of the invention;

FIG. 2 is a schematic diagram illustrating an information exchange rule in embodiments of the invention;

FIG. 10 is a diagram illustrating an exemplary play list.

DETAILED DESCRIPTION OF THE PREFERRED EMBODIMENTS

Figure 3:
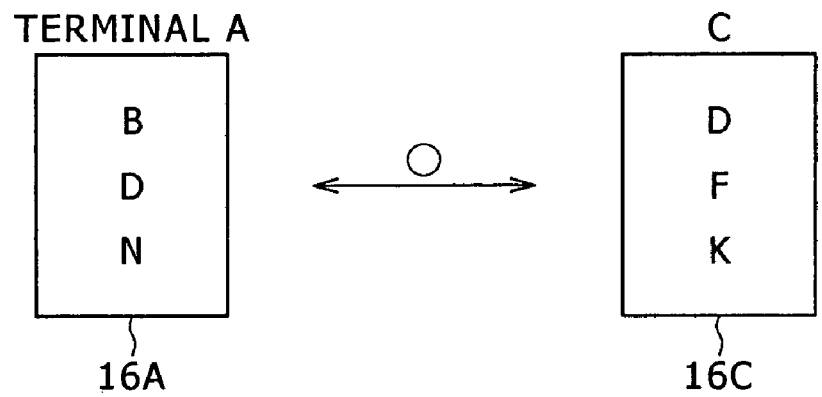
FIG. 3 is a schematic diagram illustrating another information exchange rule in embodiments of the invention.

This invention will be described in further detail by way of embodiments thereof with reference to the accompanying drawings.

(1) Outline of the Invention

The present invention is related to the information exchanged based on so-called passing-each-other communication which is defined as follows:

(A) terminal devices communicate each other via a wireless network;

(B) this wireless network is formed by not the infrastructure mode but the ad hoc mode;

(C) each terminal device is portable;

(D) each terminal device is carried on the user, by car, and so on, the upper limits of the size and weight of each terminal device being dependent on carrying manners;

(E) data of some kind is transmitted unidirectionally or exchanged bidirectionally by communication;

(F) one session of communication is completed in unit of several seconds to several tens of seconds;

(G) one session of communication may end in one unit or repeat a plurality of units;

(H) the data includes information about the user (or owner) of each terminal device;

(I) the user can recognize the owner of the data, which is not essential;

(J) the data includes information about each mate of communication (not the owner but the intermediary);

(K) the user can recognize the mate of data communication, which is not essential;

(L) before executing communication, the user executes predetermined operations, such as setting communications conditions, for example;

(M) during a session of communication, the user is generally not required to execute any operation, indicating that communication is executed automatically; and (N) if an emergency stop of communication is required during a session of communication, for example, the user can exceptionally execute an operation for that purpose.

In information exchange based on this passing-each-other communication, the mate of the communication is determined as follows:

(O) logs of any users with whom information exchange has been executed so far are recorded;

(P) when the user meets another user, the user checks if another user is recorded in the log referred to in (O) above, thereby accordingly varying the frequency of the information exchange with another user; and (Q) when the user meets another user and, if the user has not executed information exchanged directly with another user but has executed information exchange with a user common to these two user, the user accordingly varies the frequency of the information exchange with another user.

(2) Outline of Embodiment

In order to implement the above-mentioned items (O) through (Q), an information exchange log list is prepared in a target terminal device (a game machine for example) and the mate of information exchange is determined in accordance with the contents of this information exchange log list.

(2-1) Information Exchange Log List

Referring to FIG. 1, there is shown one example of the contents of the above-mentioned information exchange log list. To be specific, 16A through 16N are indicative of information exchange log lists prepared in terminal devices A through N. Log lists 16A through 16N record the identification data indicative of terminal devices with which information exchange has been executed. In FIG. 1, A through N are used as terminal device identification codes for the convenience of description and understanding.

Therefore, in the case of FIG. 1, the information exchange log list 16A is a list owned by the terminal device A and indicative that the terminal A has executed information exchange with the terminal devices B, D, and N. The information exchange log list 16B is a list owned by the terminal device B and indicative that the terminal device B has executed information exchange with the terminal devices A, I, and J. Likewise, the information exchange log list 16N is a list owned by the terminal device N and indicative that the terminal device N has executed information exchange with the terminal devices A, I, and K.

When terminal devices get close to a distance at which these terminal devices can wirelessly communicate each other, the contents of the information exchange log lists are exchanged in the wireless communication and the information exchange is executed as follows. It should be noted that, in what follows, descriptions will be made with a central focus placed on the terminal device A.

(2-2-1) Terminal Device A Getting Close to Terminal Device B (as Shown in FIG. 2)

In this case, the contents of the information exchange log lists 16A and 16B are exchanged between the terminal devices A and B in a wireless communication. Then, the information exchange log lists 16A and 16B are recorded with the logs of the information exchanged in the past between the terminal devices A and B. However, in this case, the terminal that are close to each other are only two units, the terminal devices A and B. Consequently, information exchange is executed between the terminal devices A and B.

(2-2-3) Terminal Device A Getting Close to Terminal Device C (as Shown in FIG. 3)

In this case, the contents of the information exchange log lists 16A and 16C are exchanged between the terminal device A and terminal device C in a wireless communication. Then, the information exchange log lists 16A and 16C are not recorded with the logs of past information exchange between the terminal device A and the terminal device C. In this case, the terminal devices that are close to each other are only two units, the terminal devices A and C. Consequently, information exchange is executed between the terminal devices A and C.

Figure 4:
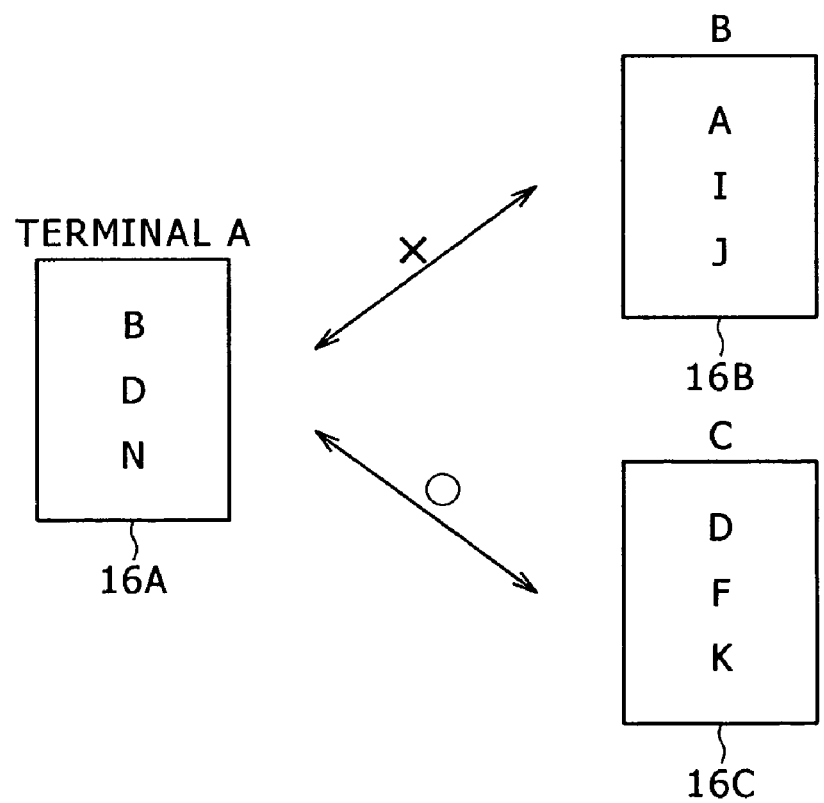
FIG. 4 is a schematic diagram illustrating still another information exchange rule in embodiments of the invention.

(2-2-3) Terminal Devices A, B, and C Getting Close to Each Other (Shown in FIG. 4)

In this case, the contents of the information exchange log lists 16A, 16B, and 16C of the terminal devices A, B, and C are exchanged between the terminal devices A, B, and C in a wireless communication. Then, the information exchange log lists 16A, 16B, and 16C are recorded with the logs past information exchange between the terminal devices A and B and the information exchange log lists 16A and 16C are not recorded with the logs of past information exchange between the terminal device A and terminal device C. Consequently, between the terminal device A and the terminal device B, the information exchange is not executed, but the information exchanged is executed between the terminal device A and the terminal device C.

Figure 5:
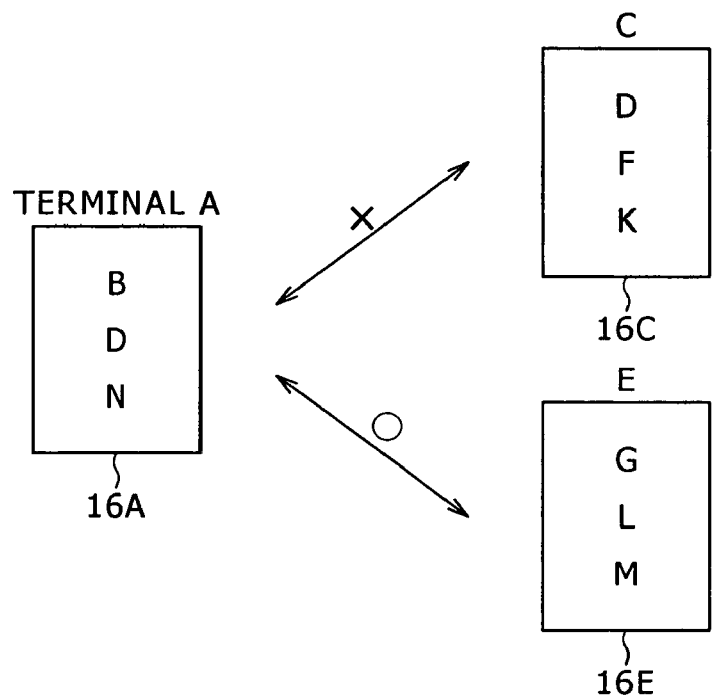
FIG. 5 is a schematic diagram illustrating yet another information exchange rule in embodiments of the invention.

(2-2-4) Terminals A, C, and E Getting Close to Each Other (as Shown in FIG. 5)

In this case, the contents of the information exchange log lists 16A, 16C, and 16E of the terminal devices A, C, and E are exchanged between the terminal devices A, C, and E in a wireless communication. then, the information exchange log lists 16A and 16C are not recorded with the logs of past information exchange between the terminal device A and the terminal device C and the logs of the past information exchange are not recorded between the terminal device A and the terminal device E.

However, in this case, the information exchange log lists 160A and 16C are recorded with the logs of the information exchange by the terminal devices A and B with the terminal device D. Namely, the information exchange log lists 16A and 16C are both recorded with the terminal device D. However, the information exchange log lists 16A and 16E are not recorded with any common terminal device. Consequently, between the terminal devices A and C, information exchange is not executed, but information exchange is executed between the terminal device A and terminal device E.

Figure 6:
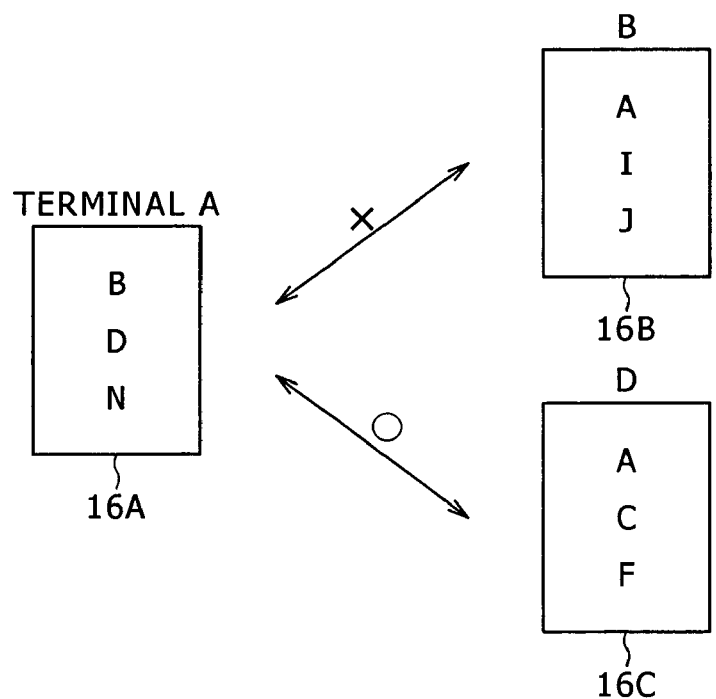
FIG. 6 is a schematic diagram illustrating another information exchange rule in embodiments of the invention.

(2-2-5) Terminal Devices A, B, and D Getting Close to Each Other (as Shown in FIG. 6)

In this case, the contents of information exchange log lists 16A, 16B, and 16D of the terminal devices A, B, and D are exchanged between the terminal devices A, B, and D in a wireless communication. Then, the information exchange log lists 16A and 16B are recorded with the logs of the past information exchange between the terminal devices A and B and the information exchange log lists 16A and 16D are recorded with the logs of the past information exchange between the terminal device A and the terminal device D.

Namely, in this case, from the viewpoint of the terminal device A, the terminal devices B and D are equal to each other in the situation of information exchange. Therefore, in this case, in the terminal device A, the mate of information exchange is selected by use of a random number for example;

consequently, the information exchange is not executed between the terminal device A and the terminal device B, but the information exchange is executed between the terminal device A and the terminal device D.

(2-2-6) Summary of Information Exchange Rules

In the above-mentioned information exchange operations and others, the information exchange rules are summarized as follows:

(1) If two terminal devices get close to each other and an information exchange operation has been executed therebetween, no information exchange is executed.

(2) If two terminal devices get close to each other and no information exchange operation has been executed therebetween, information exchange is executed.

(3) If three or more terminal devices get close to each other, information exchange is executed preferentially with a terminal device with which no information exchanged has been executed, rather than with those terminal devices with which information exchange has been executed.

(4) In rule (3) above, however, if there are two or more terminal devices that have no information exchange log, the information exchange is executed preferentially with a terminal device that has not executed the information exchange with a same terminal device, rather than a terminal device that has executed the information exchange with the same terminal device.

(5) In rules (3) and (4) above, if there are two or more mate terminal devices that satisfy the conditions of information exchange, one of the mate terminal devices is selected by use of a random number for example and the information exchange is executed with that selected terminal device.

(3) Exemplary Configuration of Terminal Device

Figure 7:
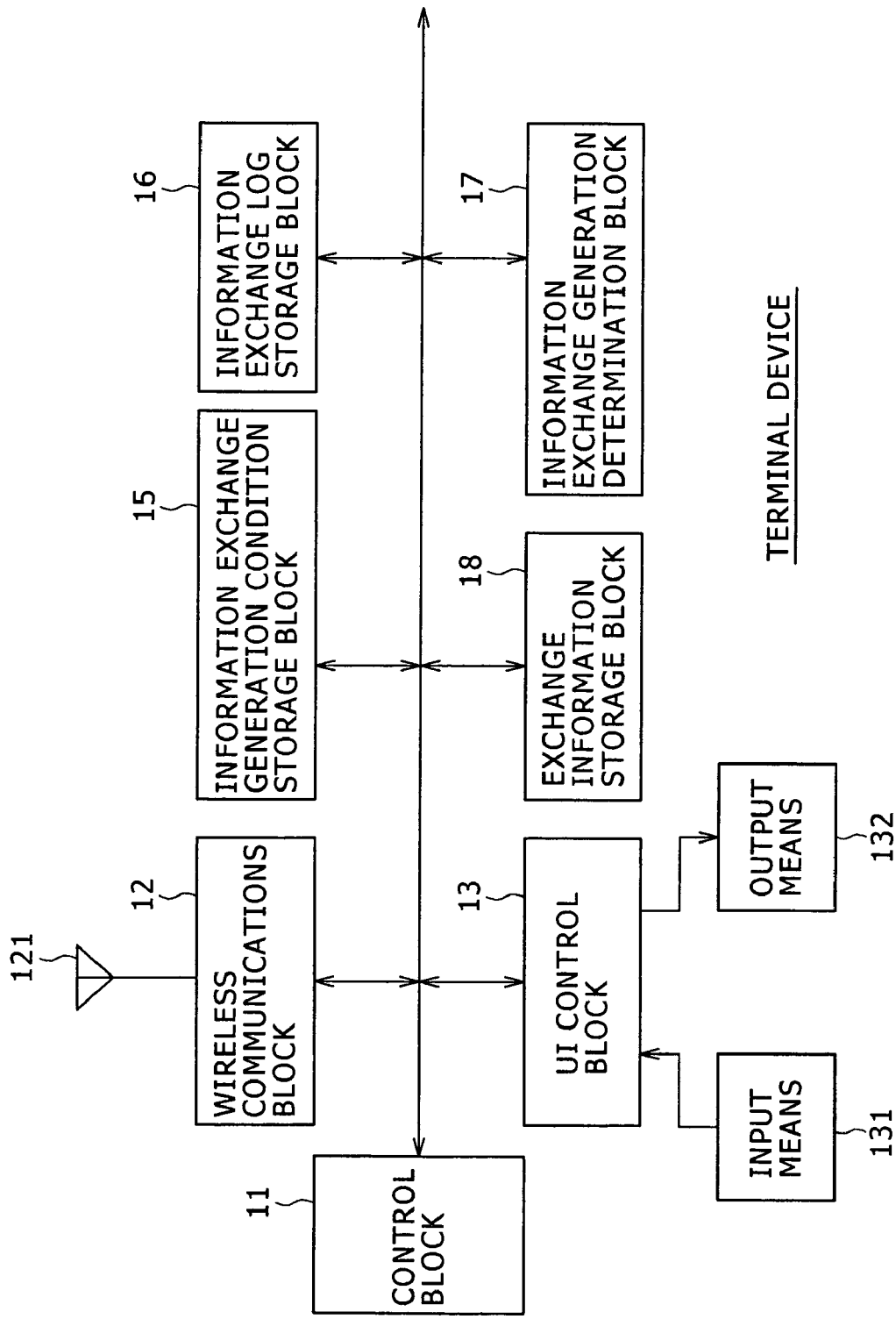
FIG. 7 is a block diagram illustrating an exemplary configuration of one embodiment of the invention.

Referring to FIG. 7, there is shown one example of the terminal device practiced as one embodiment of the invention. In FIG. 7, a controller 11, based on a microcomputer, controls the entire operation of this terminal device and controls operations of component blocks to be described below. The control block 11 is connected with a wireless communication block 12 and a user interface control block 13.

In this case, the wireless communication block 12 executes the transmission and reception of various kinds of data with other terminal devices in an ad hoc mode. When a signal from another terminal device is supplied to the wireless communication block 12 via an antenna 121, desired data is extracted from the received signal, and the extracted data is supplied to the controller 11. Further, the data from the controller 11 is converted by the wireless communication block 12 into a transmission signal, which is transmitted to the mate terminal device through the antenna 121.

The user interface control block 13 is connected with input means 131 and output means 132. The input means 131 is based on a keyboard, a mouse, buttons, a microphone, and a tablet, for example. The output means 132 is based on a display monitor and a loudspeaker, for example. When the user operates the input means 131, a corresponding signal is captured by the controller 11 through the user interface control block 13. A result of the processing done on the captured signal by the controller 11 is supplied to the output means 132 via the user interface control block 13, upon which the information indicative of the processing result is sent to the user.

Further, the controller 11 is connected with an information exchange generation condition storage block 15 and an information exchange log storage block 16. The information exchange generation condition storage block 15 stores conditions necessary for determining whether to generate information exchange, conditions necessary for determining the frequency of generating information exchange, namely, the above mentioned conditions (1) through (5). The information exchange log storage block 16 stores a log of the information exchange executed by this terminal device, one of the logs in the information exchange log list shown in FIG. 1. For example, if this terminal device is the terminal device A, the information exchange lost list 16A is stored. It should be noted that the identification code of this terminal device is prepared in this information exchange log storage block 16.

The controller 11 is also connected with an information exchange generation determination block 17 and an exchange information storage block 18. The information exchange generation determination block 17 references the information exchange generation condition storage block 15 and the information exchange log storage block 16 to determine whether to actually permit information exchange. The exchange information storage block 18 stores the information necessary for exchanging information with a mate terminal device. It should be noted that the above-mentioned storages 15 through 18 may be configured by one flash memory or a hard disk drive.

According to the above-mentioned configuration, if a plurality of terminal devices get close to each other, these terminal devices are connected by the wireless communication block 12 in the ad hoc mode, upon which the exchange of information in the exchange information storage block 18 is executed. In corresponding to this information exchange, the information exchange log list in the information exchange log storage block 16 is updated. When these processing operations are completed, the communication by the wireless communication block 12 is ended, upon which this terminal device waits for getting close to another terminal device.

As described above and according the above-mentioned terminal device, the exchange of information can be executed preferentially with a terminal device which the exchange of information has not been executed. Namely, the exchange of information is executed preferentially with those communication mates with which no contact has been made before in ordinary living and activity spheres, rather than those with which contact has been made.

Therefore, if the terminal device according to the invention is applied to a game machine for virtually growing a character, for example, the user can exchange information with another user having different sensitivities and environment, so that the user can grow the character thereof in a totally different direction. If the terminal device according to the invention is applied to a one-on-one game, for example, a match is preferentially made with an opponent with whom the user has not made a match, which would lead to a game development unthinkable so far, thereby enhancing the amusingness of the game.

Alternatively, in the case where the terminal device according to the invention is applied to a digital camera to exchange digital images, the user can execute unthinkable image exchange with unexpected persons. If the terminal device according to the invention is applied to a music player, the user can exchange play lists with strangers in a concert hall, for example.

Figure 8:
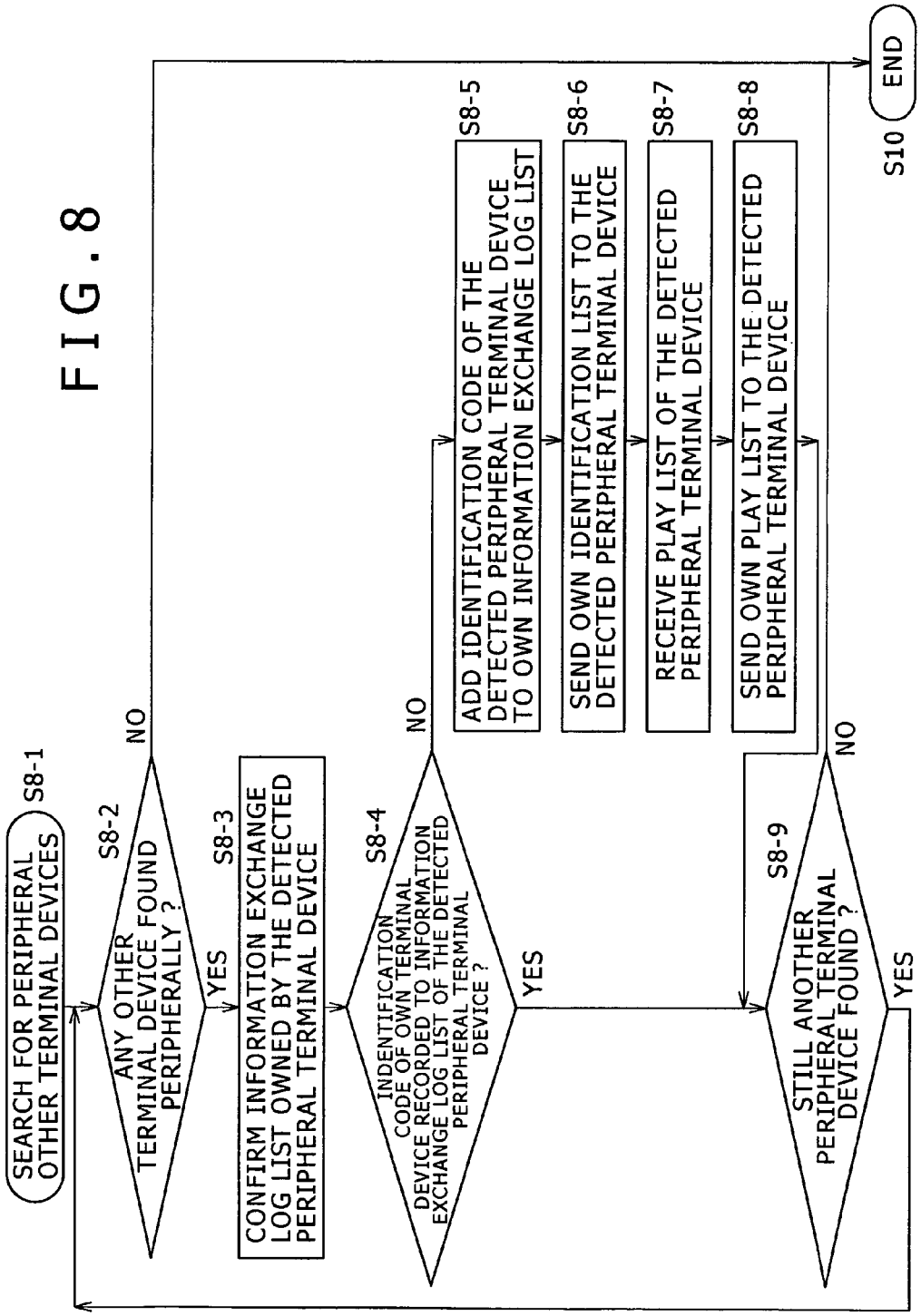
FIG. 8 is a flowchart indicative of a procedure of searching for another peripheral terminal device.

The following describes an embodiment for exchanging play lists. Each terminal device has a play list of content owned by each terminal device along with an information exchange log list. As shown in FIG. 10, the play list is configured by attribute data indicative of attributes of each piece of content. The attribute data is content identification information including artist name, album name, genre, music title, release year, and content identifier. The play list is used when reproducing content on each terminal device. The play list may be altered by the user or automatically created in accordance with predetermined criteria. The identification code of each terminal device is related with the play list of each terminal device. This configuration allows easy identification of the owner of that play list. FIG. 8 shows how the own terminal device controls the exchange of the play list with a peripheral mate terminal device. The control operation described below can be executed by the control block or the information exchange generation determination block of the own terminal device. First, the own terminal devices searches for any mate terminal device peripheral to the own terminal device (S8-1). If a mate terminal device peripheral to the own terminal device is found, the own terminal device checks the contents of the information exchange log list of that mate terminal device (S8-3). If the identification code of the own terminal device is not recorded to the information exchange log list of the mate terminal device (S8-4), the own terminal device receives the identification code of the mate terminal device, adds the received identification code to the information exchange log list of the own terminal device (S8-5), and sends the identification code of the own terminal device to the mate terminal device (S8-6), making the mate terminal device add the identification code of the own terminal device to the information exchange log list of the mate terminal device. In addition, the own terminal device receives the play list from the mate terminal device corresponding to the identification code added to the information exchange list (S8-7) and sends the play list of the own terminal device to that mate terminal device (S8-8). It should be noted that steps S5 through S8 are not restricted to the sequence shown in the figure. Consequently, it becomes practical to exchange play lists with the users of mate terminal devices with which information exchange has not been executed so far. The own terminal device that has received the play list from a mate terminal device is able to reproduce content in accordance with the received play list. The present embodiment is configured not to execute information exchange with any mate terminal devices that are already on the information exchange log list. This configuration accordingly can circumvent a problem of duplicately receiving any play lists already on the list of the own terminal device.

Figure 9:
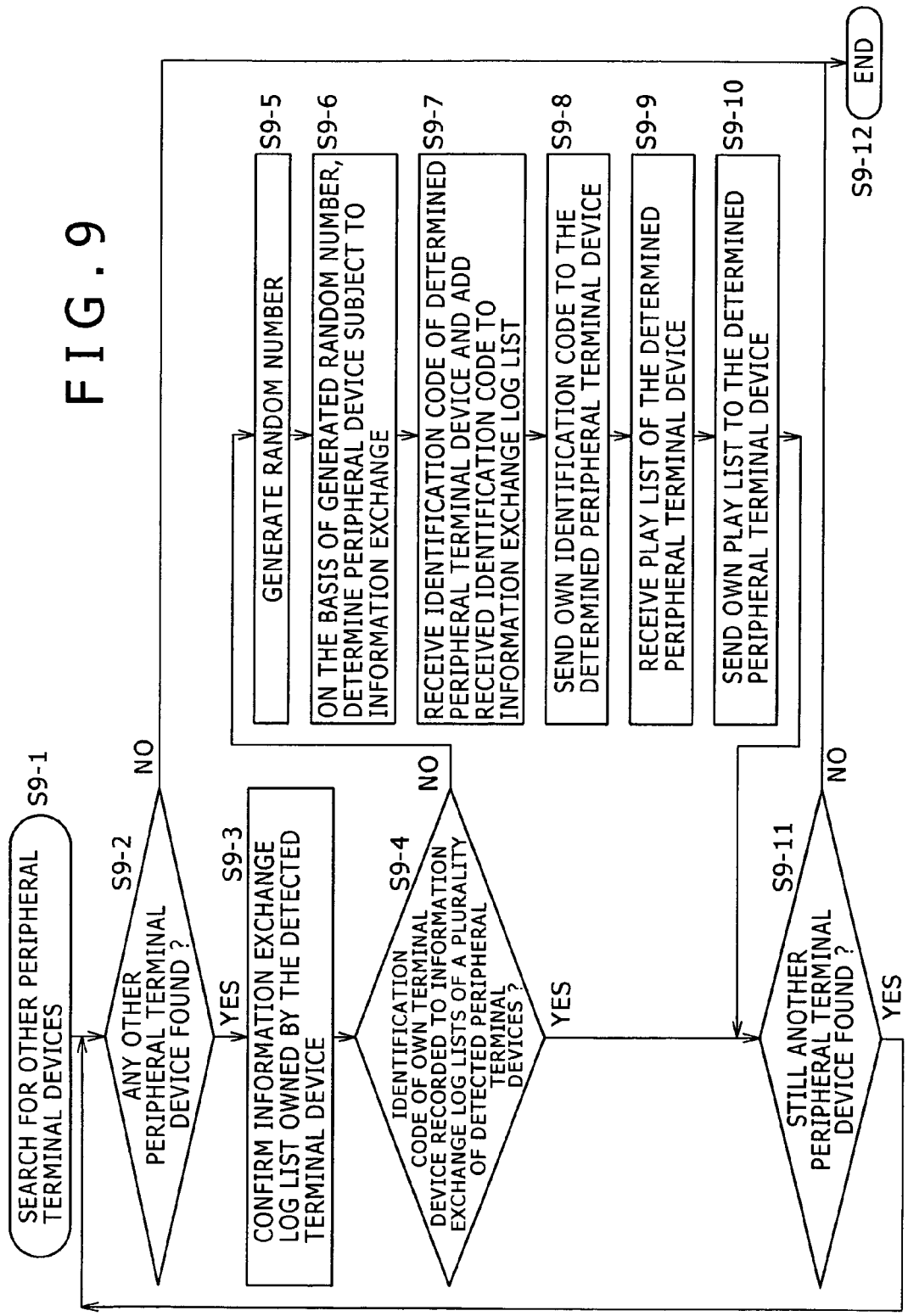
FIG. 9, is a flowchart indicative of another procedure of searching for another peripheral terminal device.

Referring to FIG. 9, there is shown a processing procedure to be executed if a plurality of mate terminal devices are found as a result of the above-mentioned search operation. If there is no log of information exchange with mate terminal devices found as a result of the search operation, then the own terminal device generates a random number (S9-5) to select one of with which to exchange play lists and determines that mate terminal device (S9-6). The own terminal device adds the identification code of the mate terminal device selected on the basis of the generated random number to the information exchange log list (S9-7) and, at the same time, receives the play list of that mate terminal device (S9-8). Further, the own terminal device can send the identification code thereof to the mate terminal device (S9-9) and the play list of the own terminal device to the mate terminal device (S1-10). It should be noted that if a plurality of mate terminal devices are found around the own terminal device, the above-mentioned control operations are repeated for each of the mate terminal devices.

At this time, it is also practicable to receive the play list and, at the same time, identification information of each mate terminal device or user identification information for identifying the user of each mate terminal device. Use of the identification information allows the easy communication with each mate terminal device when, after exchanging play lists, a conversation is wanted with the user of each mate terminal device about the contents of the exchanged play list.

(4) Others

In the above-mentioned configuration according to the invention, the identification code may be the serial number of the terminal device or the data that includes the serial number. Also, in the above-mentioned configuration according to the invention, if there are two or more mate terminal devices that satisfy the information exchange conditions, one of these mate terminal devices is selected by use of a random number. It is also practicable to select a terminal device with which the information exchange log list has been exchanged for the first time.

Further, when the identification code of a terminal device with which information exchange has been executed is recorded to the information exchange log list, the date of the information exchange can also be recorded with the identification code, thereby deleting the identification code that has passed a predetermined expiration period as well as the information exchange date from the information exchange list. This configuration allows the new information exchange even with any mate with whom information exchanged has been executed, after the predetermined expiration period. Also, if a plurality of games are prepared in one terminal device, this configuration allows the preparation of an information exchange log list for each of the games.

While preferred embodiments of the present invention have been described using specific terms, such description is for illustrative purpose only, and it is to be understood that changes and variations may be made without departing from the spirit or scope of the following claims.

What is claimed is:

1. An information processing apparatus comprising:
a wireless communication block configured to execute wireless communication with a mate terminal device;
an information exchange generation condition storage block configured to record a condition of information exchange with said mate terminal device;
an information exchange log storage block configured to record a log of information exchange with said mate terminal device; and
an information exchange generation determination block configured to determine whether to execute information exchange with said mate terminal device by referencing said information exchange condition recorded in said information exchange generation condition storage block and said log of information exchange recorded in said information exchange log storage block.

2. The information processing apparatus according to claim 1, wherein said information exchange generation determination block determines to execute information exchange with said mate terminal device if it is found, as a result of referencing said log of information exchange in said information exchange log storage block, that no information exchange has been executed with said mate terminal device.

3. The information processing apparatus according to claim 1, wherein said information exchange generation determination block determines not to execute information exchange with said mate terminal device if it is found, as a result of referencing said log of information exchange in said information exchange log storage block, that information exchange has been executed with said mate terminal device.

4. The information processing apparatus according to claim 1, wherein said information exchange generation determination block determines not to execute information exchange with said mate terminal device if it is found, as a result of referencing said log of information exchange in said information exchange log storage block, that information exchange has been executed with an information processing apparatus common to an own terminal device and said mate terminal device even if said own terminal device has not executed information exchange with said mate terminal device.

5. The information processing apparatus according to claim 1, wherein said information exchange generation determination block, if, in executing wireless communication with a plurality of mate terminal devices, it is found, as a result of referencing said log of information exchange in said information exchange log storage block, that information exchange has been executed with each of said plurality of mate terminal devices, selects a predetermined one of said plurality of mate terminal devices on the basis of a random number and determines to execute information exchange with the selected mate terminal device.

6. The information processing apparatus according to claim 1, further comprising:
   a controller configured to execute the exchange of a play list with said mate terminal device determined by said information exchange generation determination block.

7. An information processing method in an own terminal device for executing information exchange with a mate terminal device, comprising:
   executing, if a mate terminal device gets close to said own terminal device, wireless communication with said mate terminal device;
   receiving an information exchange log list from said mate terminal device;
   comparing said information exchange log list received from said mate terminal device with an information exchange log list of said own terminal device; and
   determining, on the basis of a result of the comparison, whether to execute information exchange with said mate terminal device.

8. The information processing method according to claim 7, wherein, if it is found, as a result of the comparison, that information exchange has not been executed with said mate terminal device, information exchange is executed with said mate terminal device.

9. The information processing method according to claim 7, wherein, if it is found, as a result of the comparison, that information exchange has been executed with said mate terminal device, information exchange is not executed with said mate terminal device.

10. The information processing method according to claim 7, wherein, if it is found, as a result of the comparison, that information exchange has not been executed with said mate terminal device but information exchange has been executed with an information processing apparatus common to said own terminal device and said mate terminal device, information exchange is not executed with said mate terminal device.

11. The information processing method according to claim 7, wherein the exchange of a play list is executed with a mate terminal device selected as executing information exchange.

* * * * *